(12) United States Patent
Takahashi et al.

(10) Patent No.: US 6,674,261 B2
(45) Date of Patent: Jan. 6, 2004

(54) MOTOR CONTROL APPARATUS

(75) Inventors: Yutaka Takahashi, Wako (JP); Nobuyuki Imai, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 34 days.

(21) Appl. No.: 10/131,245

(22) Filed: Apr. 25, 2002

(65) Prior Publication Data

US 2003/0030406 A1 Feb. 13, 2003

(30) Foreign Application Priority Data

Apr. 26, 2001 (JP) .................................... 2001-128985

(51) Int. Cl.[7] ................................................ H02P 6/16
(52) U.S. Cl. .................... 318/721; 318/722; 318/715; 318/714
(58) Field of Search ............................. 318/721, 722, 318/715, 714

(56) References Cited

U.S. PATENT DOCUMENTS 4,088,934 A * 5/1978 D'Atre et al. .............. 318/802
5,196,775 A * 3/1993 Harris et al. ............... 318/638
5,608,300 A * 3/1997 Kawabata et al. .......... 318/721
5,701,065 A * 12/1997 Ishizaki ..................... 318/701
6,396,229 B1 * 5/2002 Sakamoto et al. ......... 318/439

FOREIGN PATENT DOCUMENTS

| JP | 7-245981 | | 9/1995 | |
| JP | 07-245981 | * | 9/1995 | ............. H02P/6/16 |
| JP | 9-219906 | | 8/1997 | |

* cited by examiner

Primary Examiner—Rita Leykin
(74) Attorney, Agent, or Firm—Westerman, Hattori, Daniels & Adrian, LLP

(57) ABSTRACT

A sensorless detector 25 uses a rotor angle finally detected by a sensor interpolation detector 24 as an estimated value ($\theta\hat{}$) of the rotor angle of a motor 3 in a first control cycle upon changing from a rotor angle detecting process carried out by the sensor interpolation detector 24. In subsequent control cycles, the sensorless detector 25 uses estimated values ($\theta\hat{}$, $\omega\hat{}$) of the rotor angle and a rotor angular velocity in a preceding control cycle as calculation parameters, updates the calculation parameters with an observer which sequentially updates the calculation parameters depending on a phase difference ($\theta-\theta\hat{}$) calculated in the preceding control cycle in order to eliminate the phase difference, for thereby calculating the estimated value ($\theta\hat{}$) of the rotor angle of the motor 3 in the present control cycle.

7 Claims, 5 Drawing Sheets

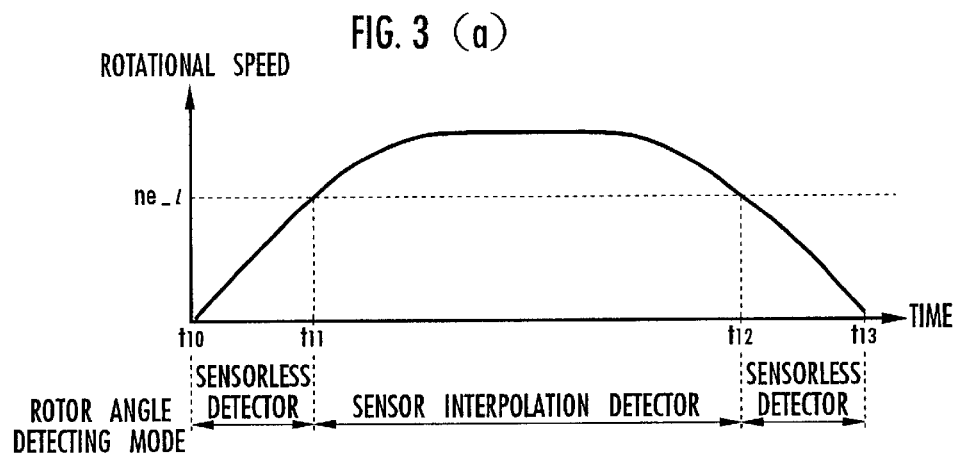
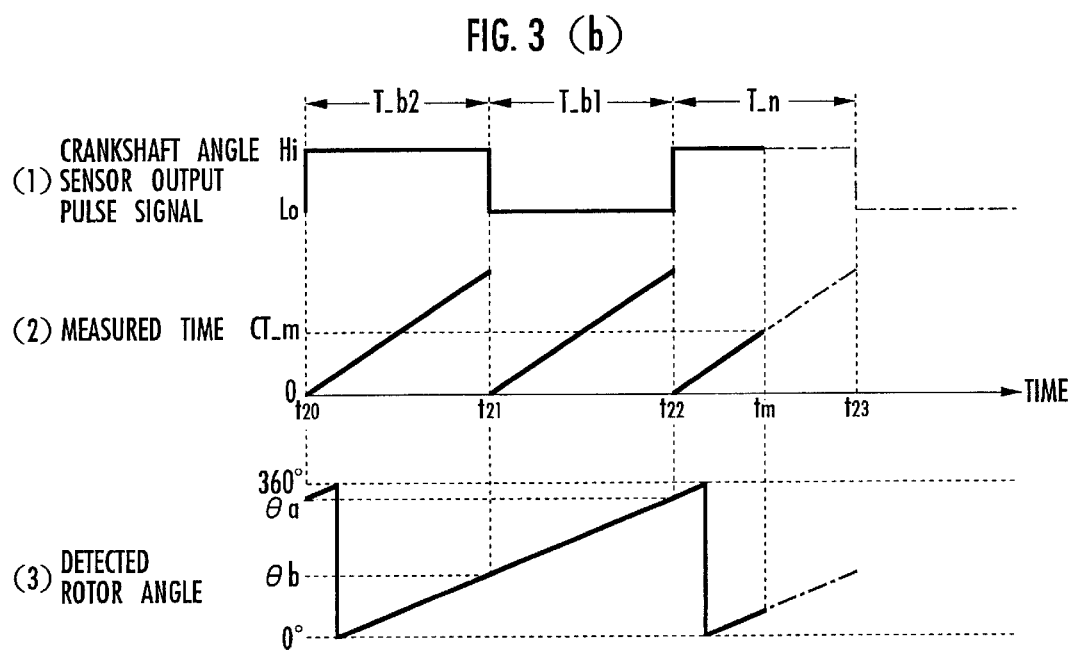

MOTOR CONTROL APPARATUS

BACKGROUND OF THE INVENTION

1. Field of the Invention

The present invention relates to a motor control apparatus for controlling a motor by detecting a rotor angle using an angle sensor in a high rotational speed range and a rotor angle without using an angle sensor in a low rotational speed range.

2. Description of the Related Art

For energizing a synchronous motor such as a DC brushless motor or the like or an induction motor to generate a desired torque, it is necessary to pass currents through the armatures of the motor at appropriate phases depending on the angle (position) of the rotor of the motor.

Therefore, the rotor is generally combined with a position detecting sensor for detecting the position of the rotor. Using the position detecting sensor increases the cost of the motor itself and also the cost of a motor control apparatus because of the position detecting sensor itself, wires for delivering an output signal from the position detecting sensor, and a receiving circuit in a motor control apparatus for receiving such an output signal. It has been proposed to detect a rotor angle in a sensorless fashion without the need for a position sensor as disclosed in Japanese laid-open patent publication No. 7-245981, for example. However, the sensorless detection of a rotor angle poses problems with respect to transient characteristics and detection accuracy particularly in a high rotational speed range.

In applications where a motor directly coupled to an engine on a hybrid vehicle is to be controlled, a crankshaft angle sensor for outputting a signal when the engine reaches a certain mechanical angular position, for thereby detecting the rotational speed of the engine may be used as a sensor for detecting the rotor angle of the motor. However, the crankshaft angle sensor is not constructed for accurately detecting the rotational speed of the engine in a low rotational speed range thereof such as when the engine is cranked.

There has been proposed, for use in hybrid vehicles, a process of detecting the rotor angle of a motor using a sensor for detecting the crankshaft angle of an engine in a high rotational speed range and detecting the rotor angle in a sensorless fashion in a low rotational speed range (see Japanese laid-open patent publication No. 9-219906).

The inventor of the present invention has found that when the rotor angle is detected in different modes depending on the rotational speed of the engine according the proposed process, the motor tends to vibrate and behave unstably upon switching between the modes.

SUMMARY OF THE INVENTION

According to the present invention, there is provided a motor control apparatus comprising a current sensor for detecting a current flowing through an armature of a motor having a salient-pole rotor, a rotational speed sensor for detecting a rotational speed of the motor, an angle sensor for outputting a pulse signal each time a rotor angle of the motor reaches a predetermined angle when the motor is rotated, high-frequency voltage applying means for applying a high-frequency voltage to the armature of the motor, rotor angle detecting means for carrying out a first rotor angle detecting process to apply the high-frequency voltage from the high-frequency voltage applying means to the armature and detect the rotor angle of the motor based on a change in the current detected by the current detector depending on the applied high-frequency voltage when the detected rotational speed of the motor is lower than a predetermined rotational speed, and carrying out a second rotor angle detecting process to detect the rotor angle of the motor based on the pulse signal outputted from the angle sensor when the detected rotational speed of the motor is equal to or higher than the predetermined rotational speed, and energization control means for controlling energization of the armature based on the rotor angle of the motor which is detected by the rotor angle detecting means.

With the above motor control apparatus, the rotor angle of the motor can be detected relatively accurately from the pulse signal which is outputted from the angle sensor upon rotation of the motor. When the motor is at rest, since the pulse signal is not outputted, the rotor angle of the motor cannot be detected. Depending on the type of the angle sensor, the output level of the pulse signal may be lowered to an undetectable level when the motor is rotating at a low speed. If the rotational speed detected by the rotational speed sensor is less than the predetermined rotational speed, then the rotor angle is detected in the first rotor angle detecting process which does not use the pulse signal.

The accuracy with which the rotor angle is detected in the first rotor angle detecting process may not necessarily be the same as the accuracy with which the rotor angle is detected in the second rotor angle detecting process. If the accuracy with which the rotor angle is detected in the first rotor angle detecting process is lower than the accuracy with which the rotor angle is detected in the second rotor angle detecting process, then the continuity of detected rotor angles detected in a transition from the second rotor angle detecting process to the first rotor angle detecting process is lost, making the behavior of the motor unstable.

According to the present invention, the rotor angle detecting means comprises means for sampling the current detected by the current sensor in each given control cycle to detect the rotor angle of the motor in the first rotor angle detecting process, and, when the second rotor angle detecting process changes to the first rotor angle detecting process, detecting the rotor angle finally detected in the second rotor angle detecting process as the rotor angle in a first control cycle of the first rotor angle detecting process, and, in subsequent control cycles, detecting the rotor angle in a present control cycle using the rotor angle detected in a preceding control cycle as a calculation parameter.

When the rotational speed of the engine shifts from a high rotational speed range equal to or higher than the predetermined rotational speed to a low rotational speed range smaller than the predetermined rotational speed, the rotor angle detecting means switches from the second rotor angle detecting process to the first rotor angle detecting process for the detection of the rotor angle of the motor.

In a first control cycle of the first rotor angle detecting process, the rotor angle detecting means uses the rotor angle finally detected in the second rotor angle detecting process as the detected rotor angle. In subsequent control cycles, the rotor angle detecting means detects the rotor angle in a present control cycle using the rotor angle detected in a preceding control cycle as a calculation parameter.

When the second rotor angle detecting process changes to the first rotor angle detecting process, the first rotor angle detecting process detects the rotor angle of the motor, reflecting the rotor angle of the motor which is finally detected in the second rotor angle detecting process.

Therefore, since the second rotor angle detecting process smoothly changes to the first rotor angle detecting process with continuity, the motor is prevented from operating unstably upon the transition from the second rotor angle detecting process to the first rotor angle detecting process.

The rotor angle detecting means comprises phase difference data generating means for generating phase difference data representing the phase difference ($\theta$–$\theta\hat{}$) between an actual value ($\theta$) and an estimated value ($\theta\hat{}$) of the rotor angle of the motor based on the detected current which is sampled in each given control cycle, and means for, in a first control cycle of the first rotor angle detecting process when the second rotor angle detecting process changes to the first rotor angle detecting process, using the rotor angle finally detected in the second rotor angle detecting process as the estimated value ($\theta\hat{}$) of the rotor angle of the motor, calculating an estimated value ($\omega\hat{}$) of a rotor angular velocity depending on a change in the rotor angle detected in the second rotor angle detecting process, and detecting the estimated value ($\theta\hat{}$) of the rotor angle as the rotor angle of the motor, and in subsequent control cycles, using the estimated values ($\theta\hat{}$, $\omega\hat{}$) of the rotor angle and the rotor angular velocity in a preceding control cycle as calculation parameters, updating the calculation parameters with an observer which sequentially updates the calculation parameters depending on the phase difference data in order to eliminate the phase difference ($\theta$–$\theta\hat{}$) represented by the phase difference data calculated by the phase difference data generating means in the preceding control cycle, for thereby calculating the estimated value ($\theta\hat{}$) of the rotor angle of the motor in the present control cycle, and detecting the estimated value ($\theta\hat{}$) of the rotor angle as the rotor angle of the motor.

With the above arrangement, the rotor angle detecting means uses the rotor angle finally detected in the second rotor angle detecting process as the estimated value ($\theta\hat{}$) of the rotor angle of the motor in the first control cycle of the first rotor angle detecting process. In subsequent control cycles, the rotor angle detecting means uses the estimated values ($\theta\hat{}$, $\omega\hat{}$) of the rotor angle and the rotor angular velocity which are calculated in the preceding control cycle as calculation parameters, and sequentially updates and calculates the estimated value ($\theta\hat{}$) of the rotor angle with the observer.

Therefore, when the second rotor angle detecting process changes to the first rotor angle detecting process, the first rotor angle detecting process detects the rotor angle of the motor, reflecting the rotor angle and the rotor angular velocity of the motor which are finally detected in the second rotor angle detecting process. Therefore, since the second rotor angle detecting process smoothly changes to the first rotor angle detecting process with continuity, the motor is prevented from operating unstably upon the transition from the second rotor angle detecting process to the first rotor angle detecting process.

The inventor of the present invention has found that the rotor angle of the motor detected in the first rotor angle detecting process is in advance of the actual rotor angle depending on the magnitude of the armature current of the motor. When the rotor angle thus detected is advanced, if the energization of the armature of the motor is controlled by the energization control means based on the detected rotor angle, then the actual rotor angle and the direction of the rotating magnetic field which is generated upon energization of the armature are brought out of phase with each other, resulting in a failure to operate the motor normally.

According to the present invention, the energization control means comprises means for handling the motor as an equivalent circuit converted therefrom having a q-axis armature disposed on a q-axis which represents the direction of magnetic fluxes produced by field poles of the rotor, and a d-axis armature disposed on a d-axis which extends perpendicularly to the q-axis, and controlling energization of the armatures of the motor depending on q- and d-axes command currents, memory means for storing reference data representing the correlation between armature currents of the motor and advanced angles of the rotor angle detected in the first rotor angle detecting process, and current command correcting means for rotating a coordinate system having the d-axis and the q-axis to correct the q- and d-axes command currents in order to eliminate an advanced angle which is obtained by applying the armature current of the motor depending on the q- and d-axes command currents to the reference data.

The current command correcting means rotates the coordinate system having the d-axis and the q-axis in order to eliminate the advanced angle which is obtained from the reference data, thereby to correct the q- and d-axes command currents. The effect of the advanced angle can thus be removed.

The rotor angle detecting means comprises time measuring means for starting to measure time each time the pulse signal is inverted, pulse inversion time memory means for storing the time measured by the time measuring means as a pulse inversion time between a preceding pulse inversion and a present pulse inversion each time the pulse signal is inverted, pulse inversion time estimating means for determining an estimated pulse inversion time which represents an estimated value of a time from the present pulse inversion to a next pulse inversion based on a plurality of pulse inversion times which are stored in the pulse inversion time memory means, each time the pulse signal is inverted, and means for detecting a present rotor angle from the ratio of the time measured by the time measuring means to the present estimated pulse inversion time in the second rotor angle detecting process.

The pulse inversion time estimating means determines a present estimated pulse inversion time based on a plurality of pulse inversion times which are stored in the pulse inversion time memory means, for thereby reflecting a change in the pulse inversion time and determining the estimated pulse inversion time with greater accuracy.

If the motor is connected to an engine mounted on a hybrid vehicle, and a crankshaft angle sensor is associated with the engine, then when the motor is rotating with the engine, the crankshaft angle sensor outputs a pulse signal each time the crankshaft of the engine reaches a certain angular position. Using the rotor angle of the motor at the time the crankshaft of the engine reaches the certain angular position, as the predetermined angle, the crankshaft angle sensor can be used as the angle sensor. With this arrangement, the motor control apparatus is made less costly because there is no need to provide the angle sensor as a dedicated angle sensor.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 3(a) and 3(b) are graphs illustrative of a process of detecting the rotor angle of the motor in the motor control apparatus shown in FIG. 1;

DESCRIPTION OF THE PREFERRED EMBODIMENT

Figure 1:
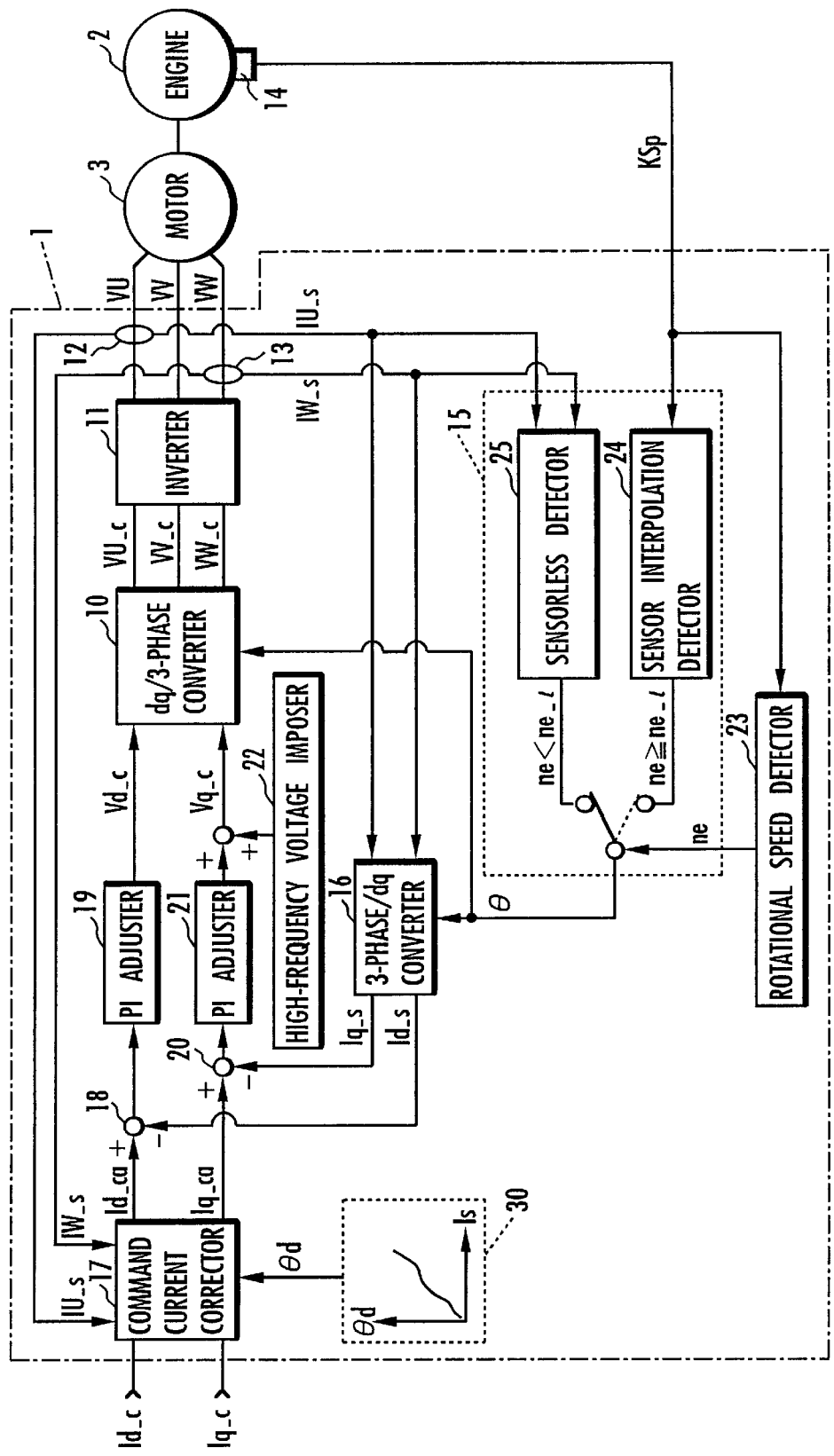
FIG. 1 is a block diagram of a motor control apparatus according to the present invention.
Figure 2:
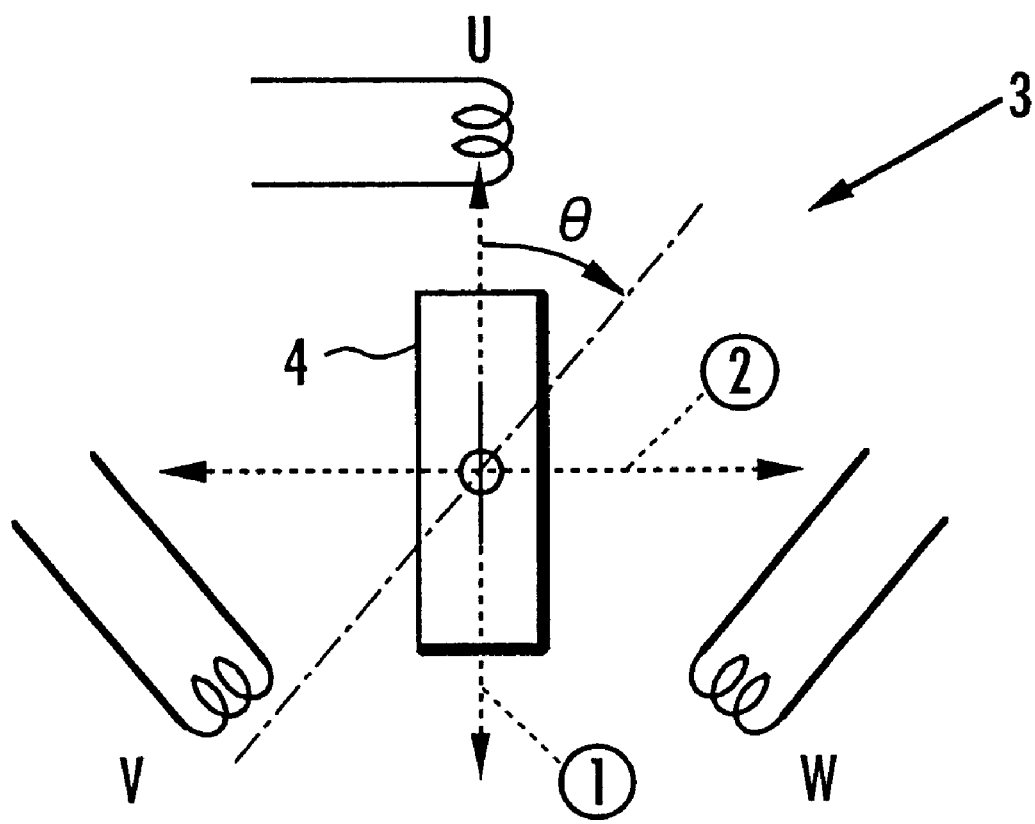
FIG. 2 is a schematic diagram showing a motor controlled by the motor control apparatus shown in FIG. 1.

As shown in FIG. 1, a motor control apparatus 1 according to the present invention is in the form of an electronic unit comprising a microcomputer, a memory, and other components, and serves to control, through a feedback loop, currents flowing through the armatures of a three-phase (U, V, W) salient-pole DC brushless motor 3 (hereinafter referred to simply as "motor 3") connected to an engine 2 on a hybrid vehicle. As shown in FIG. 2, the motor control apparatus 1 handles the motor 3 as an equivalent circuit converted therefrom in a dq coordinate system having a q-axis armature disposed on a q-axis (indicated by ① in FIG. 2), which represents the direction of magnetic fluxes produced by field poles of a rotor 4, and a d-axis armature disposed on a d-axis (indicated by ② in FIG. 2) which extends perpendicularly to the q-axis. In FIG. 2, θ represents the rotor angle of the motor 3 as measured from the direction of the U phase of the motor 3.

The motor control apparatus 1 controls the voltages applied to the armatures of the motor 3 in order to equalize a d-axis command current (Id_c) which is a command value for a current supplied from an external source and flowing through the d-axis armature (hereinafter referred to as "d-axis current") and a q-axis command current (Iq_c) which is a command value for a current supplied from an external source and flowing through the q-axis armature (hereinafter referred to as "q-axis current"), respectively to a detected d-axis current (Id_s) which is a detected value of the d-axis current and a detected q-axis current (Iq_s) which is a detected value of the q-axis current, which are calculated by 3-phase/dq conversion from the detected values of actual currents flowing through the armatures of the motor 3.

The motor control apparatus 1 has a dq/3-phase converter 10 for converting a d-axis command voltage (Vd_c) which is a command value for a voltage applied to the d-axis armature (hereinafter referred to as "d-axis voltage") and a q-axis command voltage (Vq_c) which is a command value for a voltage applied to the q-axis armature (hereinafter referred to as "q-axis voltage"), respectively into a U-phase voltage command (VU_c), a V-phase voltage command (VV_c), and a W-phase voltage command (VW_c) which are command values for voltages applied to the armatures in the three phases U, V, W of the motor 3, and an inverter 11 for applying three-phase voltages (VU, VV, VW) depending respectively on the U-phase voltage command (VU_c), the V-phase voltage command (VV_c), and the W-phase voltage command (VW_c) to the respective armatures in the three phases U, V, W of the motor 3.

The motor control apparatus 1 also has a U-phase current sensor 12 (corresponding to a current sensor according to the present invention) for detecting a current flowing through the U-phase armature of the motor 3, a W-phase current sensor 13 (corresponding to a current sensor according to the present invention) for detecting a current flowing through the W-phase armature of the motor 3, a rotor angle detector 15 (corresponding to a rotor angle detecting means according to the present invention) for detecting the rotor angle of the motor 3 using a detected current (IU_s) from the U-phase current sensor 12, a detected current (IW_s) from the W-phase current sensor 13, and a pulse signal (KSp) outputted from a crankshaft angle sensor 14 (corresponding to a rotational speed sensor and an angle sensor according to the present invention) associated with the engine 2, and a 3-phase/dq converter 16 for calculating a detected d-axis current (Id_s) and a detected q-axis current (Iq_s) depending on a detected current (IU_s) from the U-phase current sensor 12 and a detected current (IW_s) from the W-phase current sensor 13.

The crankshaft angle sensor 14 outputs one pulse of the pulse signal each time the crankshaft (not shown) of the engine 1 reaches a predetermined angular position. Since the motor 3 is directly coupled to the engine 2, the output level of the pulse signal (KSp) outputted from the crankshaft angle sensor 14 is inverted each time the rotor angle of the motor 3 reaches a predetermined angle.

The motor control apparatus 1 operates as follows: When the rotor angle is detected by a sensorless detector 25 (described later on) with respect to the d-axis command current (Id_c) and the q-axis command current (Iq_c), a command current corrector 17 corrects a command current based on the detected current (IU_s) and the detected current (IW_s) as described later on. A first subtractor 18 subtracts the detected d-axis current (Id_s) from the d-axis current command (Id_c) or a corrected d-axis current command (Id_ca) thereby to calculate their difference, which is subjected to a PI (proportional plus integral) process by a first PI adjuster 19, thus generating a d-axis command voltage (Vd_c) depending on the difference between the d-axis current command (Id_c) and the detected d-axis current (Id_s).

Similarly, a second subtractor 20 subtracts the detected q-axis current (Iq_s) from the q-axis current command (Iq_c) or a corrected q-axis current command (Iq_ca) thereby to calculate their difference, which is subjected to a PI (proportional plus integral) process by a second PI adjuster 21. When the rotor angle is detected by the sensorless detector 25, a high-frequency voltage imposer 22 imposes a high-frequency voltage on an output signal from the second PI adjuster 21, thus generating a q-axis command voltage (Vq_c) depending on the difference between the q-axis current command (Iq_c) and the detected q-axis current (Iq_s).

The d-axis command voltage (Vd_c) and the q-axis command voltage (Vq_c) are then supplied to the dq/3-phase converter 10. The inverter 11 applies three-phase voltages (VU, VV, VW) to the respective armatures in the three phases U, V, W of the motor 3 in order to eliminate the difference between the d-axis current command (Id_c) and the detected d-axis current (Id_s) and the difference between the q-axis current command (Iq_c) and the detected q-axis current (Iq_s), thereby controlling the energization of the armatures of the motor 3. The dq/3-phase converter 10 and the inverter 10 jointly serve as an energization control means.

For converting a detected U-phase current (IU_s) and a detected W-phase current (IW_s) into a detected d-axis current (Id_s) and a detected q-axis current (Iq_s), respectively, the 3-phase/dq converter 16 needs the rotor angle of the motor 3. For converting a d-axis command voltage (Vd_c) and a q-axis command voltage (Vq_c) into a U-phase voltage command (VU_c), a V-phase voltage command (VV_c), and a W-phase voltage command (VW_c), the 3-phase/dq converter 16 also needs the rotor angle of the motor 3. Since the motor 3 does not have a position detecting sensor for detecting the rotor angle thereof, the rotor angle detector 15 detects the rotor angle of the motor 3 without using any position detecting sensor. A process of detecting the rotor angle of the motor 3 with the rotor angle detector 15 will be described below.

When a detected rotational speed (ne) of the motor 3 which is detected from a rotational speed detector 23 based on the pulse signal (KSp) from the crankshaft angle sensor 14 is equal to or higher than a predetermined rotational speed (ne_1) (ne≧ne_1), a sensor interpolation detector 24 detects the rotor angle based on the pulse signal (KSp). When the detected rotational speed (ne) of the motor 3 is less than the predetermined rotational speed (ne_1) (ne<ne_1), the sensorless detector 25 detects the rotor angle without using the pulse signal (KSp).

The rotor angle is detected without using the pulse signal (KSp) when the detected rotational speed (ne) of the motor 3 is less than the predetermined rotational speed (ne_1) because when the motor 3 is de-energized, the pulse signal (KSp) is not outputted, and the crankshaft angle sensor 14 is generally not arranged to accurately detect the rotational speed of the engine 2 in a low rotational speed range which is included in the cranking rotational speed of the engine 2.

FIG. 3(a) shows an example in which the rotor angle of the motor 3 is detected selectively by a process of detecting the rotor angle with the sensor interpolation detector 24 (corresponding to a first rotor angle detecting process) and a process of detecting the rotor angle with the sensorless detector 25 (corresponding to a second rotor angle detecting process). In FIG. 3(a), the motor 3 starts rotating at a time $t_{10}$, the rotational speed of the motor 3 exceeds the predetermined rotational speed (ne_1) at a time $t_{11}$, thereafter decreases, becomes lower than the predetermined rotational speed (ne_1) at a time $t_{12}$, and then the motor 3 stops rotating at a time $t_{13}$.

During those periods ($t_{10}$–$t_{11}$), ($t_{12}$–$t_{13}$) in which the rotational speed of the motor 3 is lower than the predetermined rotational speed (ne_1), the sensorless detector 25 detects the rotor angle of the motor 3. In the period ($t_{11}$–$t_{12}$) in which the rotational speed of the motor 3 is equal to or higher than the predetermined rotational speed (ne_1), the sensor interpolation detector 24 detects the rotor angle of the motor 3.

First, the process of detecting the rotor angle with the sensor interpolation detector 24 will be described below. The process of detecting the rotor angle with the sensor interpolation detector 24 is carried out by interpolating the pulse signal (KSp) outputted from the crankshaft angle sensor 14. The pulse signal (KSp) outputted from the crankshaft angle sensor 14 has its output level inverted (Hi→Lo, Lo→Hi) each time the rotor 4 of the motor 4 rotates 180°.

The sensor interpolation detector 24 includes the functions of a time measuring means, a pulse inversion time memory means, and a pulse inversion time estimating means according to the present invention. Each time the pulse signal (KSp) is inverted, the sensor interpolation detector 24 starts measuring time. Each time the pulse signal (KSp) is inverted, the sensor interpolation detector 24 stores a time measured from a preceding pulse inversion to a present pulse inversion as a pulse inversion time in a memory. The sensor interpolation detector 24 calculates an estimated pulse inversion time which is an estimated value of a time from the present pulse inversion to a next pulse inversion based on a plurality of pulse inversion times thus stored in the memory.

FIG. 3(b) is a diagram illustrative of the process of detecting the rotor angle with the sensor interpolation detector 24. In FIG. 3(b), (1) represents changes with time of the pulse signal (KSp) outputted from the crankshaft angle sensor 14, (2) represents changes with time of the time measured by the sensor interpolation detector 24, and (3) represents changes with time of the detected value of the rotor angle.

The sensor interpolation detector 24 starts measuring time ($t_{20}$, $t_{21}$, $t_{22}$) each time the pulse signal (KSp) is inverted. In FIG. 3(b), $t_m$ represents the present time. When the pulse signal (KSp) is inverted, the sensor interpolation detector 24 calculates an estimated pulse inversion time (T_n) which is a time until the pulse signal (KSp) is inverted next. The following equation (1) represents a formula for calculating the estimated pulse inversion time (T_n) at the time $t_{22}$:

$$T\_n = T\_b1 + (T\_b1 - T\_b2) \quad (1)$$

where T_b1: first preceding pulse inversion time, T_b2: second pulse inversion time which precedes the first preceding pulse inversion time.

Specifically, the sensor interpolation detector 24 adds a change or difference (T_b1−T_b2) between the two preceding pulse inversion times (T_b1, T_b2) to the preceding pulse inversion time T_b1 stored in the memory, thus calculating the estimated pulse inversion time (T_n). Since, while the rotational speed of the motor 3 is changing, the estimated pulse inversion time (T_n) is calculated depending on the tendency of the changing of the rotational speed of the motor 3, the accuracy of the estimated pulse inversion time (T_n) is increased.

The rotor angle at the time the output level of the pulse signal (KSp) is inverted from Lo to Hi and the rotor angle at the time the output level of the pulse signal (KSp) is inverted from Hi to Lo are mechanically determined. The sensor interpolation detector 24 stores these rotor angles as θa, θb in the memory. The sensor interpolation detector 24 calculates the rotor angle θHi during the periods ($t_{20}$–$t_{21}$, $t_{22}$–) in which the pulse signal (KSp) is of the Hi level and the rotor angle θLo during the period ($t_{21}$–$t_{22}$) in which the pulse signal (KSp) is of the Lo level according to the following equations (2), (3), respectively, thus detecting the rotor angle:

$$\theta Hi = \theta a + \frac{Ct\_m}{T\_n} \times 180 (\text{degrees}) \quad (2)$$

$$\theta Lo = \theta b + \frac{Ct\_m}{T\_n} \times 180 (\text{degrees}) \quad (3)$$

where CT_m represents time measured from the preceding inversion of the pulse signal (KSp).

If the rotor angles calculated according to the above equations (2), (3) exceed 360 degrees, then the 360 degrees are subtracted to correct the detected value of the rotor angle.

The process of detecting the rotor angle with the sensorless detector 25 will be described below. The sensorless detector 25 includes the function of a phase difference data generating means according to the present invention. In a low rotational speed range in which the detected rotational speed (ne) of the motor 3 is lower than the predetermined rotational speed (ne_1), the high-frequency voltage imposer 22 imposes a high-frequency voltage on the output signal from the second PI adjuster 21 thereby to generate a q-axis command voltage (Vq_c). The sensorless detector 25 detects the rotor angle of the motor 3 from a change in the d-axis command current (Id_c) depending on the imposed high-frequency voltage.

A linear model of the motor 3 is expressed by the following equation (4), and a state equation thereof is given as the following equation (5):

$$\begin{bmatrix} Vd \\ Vq \end{bmatrix} = \begin{bmatrix} r + \frac{d}{dt}Ld & -\omega Lq \\ \omega Ld & r + \frac{d}{dt}Lq \end{bmatrix} \begin{bmatrix} Id \\ Iq \end{bmatrix} + \begin{bmatrix} \omega Ke \\ 0 \end{bmatrix} \quad (4)$$

$$\frac{d}{dt}\begin{bmatrix} Id \\ Iq \end{bmatrix} = \begin{bmatrix} -\frac{r}{Ld} & \omega\frac{Lq}{Ld} \\ -\omega\frac{Ld}{Lq} & -\frac{r}{Lq} \end{bmatrix} \begin{bmatrix} Id \\ Iq \end{bmatrix} + \begin{bmatrix} \frac{1}{Ld} & 0 \\ 0 & \frac{1}{Lq} \end{bmatrix} \left\{ \begin{bmatrix} Vd \\ Vq \end{bmatrix} - \begin{bmatrix} \omega Ke \\ 0 \end{bmatrix} \right\} \quad (5)$$

where Vd: the d-axis voltage, Vq: the q-axis voltage, Id: the d-axis current, Iq: the q-axis current, r: the resistance of the d-axis armature and the q-axis armature, Ld: the inductance of the d-axis armature, Lq: the inductance of the q-axis armature, ω: the angular velocity of the rotor.

If the estimated value (θ^) and the actual value (θ) of the rotor angle deviate from each other by θe (θe=θ−θ^), then the relationship between the estimated value (Id^) and the actual value (Id) of the d-axis current, the relationship between the estimated value (Iq^) and the actual value (Iq) of the q-axis current, the relationship between the estimated value (Vd^) and the actual value (Vd) of the d-axis voltage, and the relationship between the estimated value (Vq^) and the actual value (Vq) of the q-axis voltage are expressed by the following equations (6), (7):

$$\begin{bmatrix} \hat{I}d \\ \hat{I}q \end{bmatrix} = \begin{bmatrix} \cos\theta e & -\sin\theta e \\ \sin\theta e & \cos\theta e \end{bmatrix} \begin{bmatrix} Id \\ Iq \end{bmatrix} \quad (6)$$

$$\begin{bmatrix} \hat{V}d \\ \hat{V}q \end{bmatrix} = \begin{bmatrix} \cos\theta e & -\sin\theta e \\ \sin\theta e & \cos\theta e \end{bmatrix} \begin{bmatrix} Vd \\ Vq \end{bmatrix} \quad (7)$$

Therefore, a state equation with respect to the estimated values (Id^, Iq^) of the Id current and the Iq current is given as the following equation (8) from the equations (5), (6):

$$\frac{d}{dt}\begin{bmatrix} \hat{I}d \\ \hat{I}q \end{bmatrix} = \begin{bmatrix} \cos\theta e & -\sin\theta e \\ \sin\theta e & \cos\theta e \end{bmatrix} \frac{d}{dt}\begin{bmatrix} Id \\ Iq \end{bmatrix} = \quad (8)$$

$$\begin{bmatrix} \cos\theta e & -\sin\theta e \\ \sin\theta e & \cos\theta e \end{bmatrix} \begin{bmatrix} -\frac{r}{Ld} & \omega\frac{Lq}{Ld} \\ -\omega\frac{Ld}{Lq} & -\frac{r}{Lq} \end{bmatrix} \begin{bmatrix} \cos\theta e & \sin\theta e \\ -\sin\theta e & \cos\theta e \end{bmatrix} \begin{bmatrix} \hat{I}d \\ \hat{I}q \end{bmatrix} +$$

$$\begin{bmatrix} \cos\theta e & -\sin\theta e \\ \sin\theta e & \cos\theta e \end{bmatrix} \begin{bmatrix} \frac{1}{Ld} & 0 \\ 0 & \frac{1}{Lq} \end{bmatrix} \begin{bmatrix} \cos\theta e & \sin\theta e \\ -\sin\theta e & \cos\theta e \end{bmatrix}$$

$$\left\{ \begin{bmatrix} Vd \\ Vq \end{bmatrix} - \begin{bmatrix} \omega Ke \\ 0 \end{bmatrix} \right\}$$

If a high-frequency voltage (sin 2πft) is applied to the q-axis armature when ω≈0, then the equation (8) becomes the following equation (9):

$$\frac{d}{dt}\begin{bmatrix} \hat{I}d \\ \hat{I}q \end{bmatrix} = \begin{bmatrix} -\frac{1}{Ld}\cos^2\theta e - \frac{1}{Lq}\sin^2\theta e & -\left(\frac{1}{Ld} - \frac{1}{Lq}\right)\cos\theta e\sin\theta e \\ -\left(\frac{1}{Ld} - \frac{1}{Lq}\right)\cos\theta e\sin\theta e & -\frac{1}{Ld}\sin^2\theta e - \frac{1}{Lq}\cos^2\theta e \end{bmatrix} \times \quad (9)$$

$$\left\{ r\begin{bmatrix} \hat{I}d \\ \hat{I}q \end{bmatrix} + \begin{bmatrix} 0 \\ \sin 2\pi ft \end{bmatrix} \right\} =$$

$$\frac{1}{2}\begin{bmatrix} -\left(\frac{1}{Ld} + \frac{1}{Lq}\right) - \left(\frac{1}{Ld} - \frac{1}{Lq}\right)\cos 2\theta e & -\left(\frac{1}{Ld} - \frac{1}{Lq}\right)\sin 2\theta\frac{e}{2} \\ -\left(\frac{1}{Ld} - \frac{1}{Lq}\right)\sin 2\theta\frac{e}{2} & -\left(\frac{1}{Ld} + \frac{1}{Lq}\right) + \left(\frac{1}{Ld} - \frac{1}{Lq}\right)\cos 2\theta e \end{bmatrix} \times$$

$$\left\{ r\begin{bmatrix} \hat{I}d \\ \hat{I}q \end{bmatrix} + \begin{bmatrix} 0 \\ \sin 2\pi ft \end{bmatrix} \right\}$$

In the vicinity of θe=0, since the approximations sin θ≈0 and cos θ≈0 are satisfied, the above equation (9) can be approximated by the following equation (10):

$$\frac{d}{dt}\begin{bmatrix} \hat{I}d \\ \hat{I}q \end{bmatrix} = \quad (10)$$

$$\frac{1}{2}\begin{bmatrix} -\frac{2}{Ld} & -\left(\frac{1}{Ld} - \frac{1}{Lq}\right)\theta e \\ -\left(\frac{1}{Ld} - \frac{1}{Lq}\right)\theta e & -\frac{2}{Ld} \end{bmatrix} \left\{ r\begin{bmatrix} \hat{I}d \\ \hat{I}q \end{bmatrix} + \begin{bmatrix} 0 \\ \sin 2\pi ft \end{bmatrix} \right\}$$

Therefore, the phase difference (θe) between the actual value (θ) and the estimated value (θ^) of the rotor angle can be detected from the magnitude of the interference term. To calculate the magnitude of the interference term, a high-frequency component included in the Id component may be detected. The magnitude of the interference term can easily be calculated by a Fourier transform or the like.

A transfer function (G(s)) depending on the state equation (10) is expressed by the following equation (11):

$$G(s) = [1 0] \begin{bmatrix} s + \frac{r}{Ld} & -r\frac{Ld-Lq}{2LdLq}\theta e \\ -r\frac{Ld-Lq}{2LdLq}\theta e & s + \frac{r}{Lq} \end{bmatrix}^{-1} \begin{bmatrix} \frac{1}{Ld} & -\frac{Ld-Lq}{2LdLq} \\ -\frac{Ld-Lq}{2LdLq}\theta e & \frac{1}{Lq} \end{bmatrix} \begin{bmatrix} 0 \\ 1 \end{bmatrix} = \quad (11)$$

$$\frac{1}{s^2 + r\frac{Ld+Lq}{LdLq}s + \frac{r^2}{LdLq} - \left[r\frac{Ld-Lq}{2LdLq}\theta e\right]^2} \left[s + \frac{r}{Ld} - r\frac{Ld-Lq}{2LdLq}\theta e\right] \begin{bmatrix} -\frac{Ld-Lq}{LdLq}\theta e \\ \frac{1}{Lq} \end{bmatrix} =$$

$$\frac{-\frac{Ld-Lq}{LdLq}\theta e\left[s + rLd - \frac{Lq}{2LdLq}\right]}{s^2 + r\frac{Ld+Lq}{LdLq}s + \frac{r^2}{LdLq}\left[1 - \frac{(Ld-Lq)^2}{4LdLq}\theta e^2\right]}$$

Because the DC gain of the transfer function (G(s)) is negative and the degree difference between the numerator and denominator is 1, the estimated value ($\theta^\wedge$) of the rotor angle is brought 270 degrees out of phase with the actual value ($\theta$) of the rotor angle when a high-frequency voltage having a sufficiently high frequency is applied. If the phase difference ($\theta e$) is approximately 0 ($\theta e \approx 0$), then on the assumption that the square terms of $\theta e$ are negligible, the Id current can be approximated by the following equations (12) through (14):

$$Id \approx -|G(j\omega)|\theta e \cos 2\pi ft \quad (12)$$

$$G(s) = \frac{-\frac{Ld-Lq}{LdLq}\left[s + rLd - \frac{Lq}{2LdLq}\right]}{s^2 + r\frac{Ld+Lq}{LdLq}s + \frac{r^2}{LdLq}} \quad (13)$$

$$|G(j\omega)| = \sqrt{\text{Re}(G(j\omega))^2 + \text{Im}(G(j\omega))^2} \quad (14)$$

Therefore, a cosine component proportional to the phase difference ($\theta e$) can be calculated by an integrating operation according to the following equation (15) which uses an operation coefficient (K) according to the following equation (16):

$$\theta e = \frac{1}{K}\int_0^{2\pi}(Id \cdot \cos 2\pi ft)\,dt \quad (15)$$

$$K = -\frac{|G(j\omega)|}{2} \quad (16)$$

Data (phase difference data) representing the phase difference ($\theta e$) can be generated by putting the detected d-axis current (Id_s) into Id in the equation (15).

Figure 4:
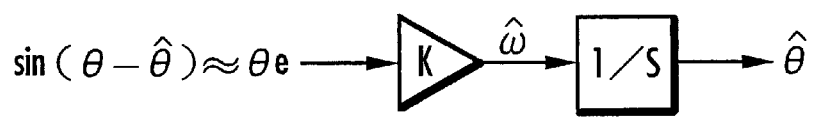
FIG. 4(a) is block diagram of a system for calculating an estimated value (θ^) of the rotor angle from the phase difference (θe=θ−θ^) between the actual and estimated values of the rotor angle.
FIG. 4(b) is a graph showing the correlation between advanced angles and armature currents.
Figure 4:
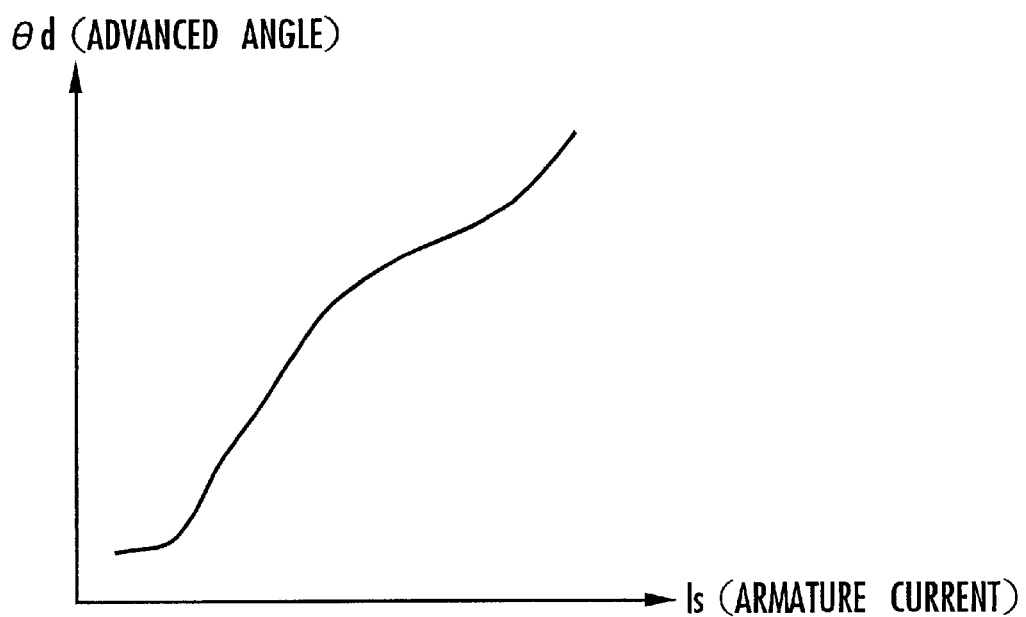

From the phase difference ($\theta e$) thus generated, there could be determined the estimated value ($\theta^\wedge$) of the rotor angle through a feedback process on the estimated value ($\theta^\wedge$) of the rotor angle as shown in FIG. 4(a). Since, however, ($\theta - \theta^\wedge) \approx 0$, it can be understood that an error would occur between the estimated value ($\theta^\wedge$) and the actual value ($\theta$) of the rotor angle when the angular velocity is not 0.

According to the present embodiment, the sensorless detector 25 performs a follow-up operation with an observer as indicated by the following equation (17) for calculating the estimated value ($\theta^\wedge$) of the rotor angle and the estimated value ($\omega^\wedge$) of the rotor angular velocity:

$$\begin{bmatrix} \dot{\hat{\theta}} \\ \dot{\hat{\omega}} \end{bmatrix} = \begin{bmatrix} 0 & 1 \\ 0 & 0 \end{bmatrix}\begin{bmatrix} \hat{\theta} \\ \hat{\omega} \end{bmatrix} + \begin{bmatrix} 0 \\ K \end{bmatrix}\sin(\theta - \hat{\theta}) \approx \begin{bmatrix} 0 & 1 \\ 0 & 0 \end{bmatrix}\begin{bmatrix} \hat{\theta} \\ \hat{\omega} \end{bmatrix} + \begin{bmatrix} 0 \\ K \end{bmatrix}\theta e \quad (17)$$

A state equation relative to an error between the actual value ($\theta$) and the estimated value ($\theta^\wedge$) of the rotor angle and an error between the actual value ($\omega$) and the estimated value ($\omega^\wedge$) of the rotor angular velocity is given as the following equation (18):

$$\begin{bmatrix} \dot{\theta} - \dot{\hat{\theta}} \\ \dot{\omega} - \dot{\hat{\omega}} \end{bmatrix} = \begin{bmatrix} 0 & 1 \\ 0 & 0 \end{bmatrix}\begin{bmatrix} \theta \\ \omega \end{bmatrix} - \begin{bmatrix} 0 & 1 \\ 0 & 0 \end{bmatrix}\begin{bmatrix} \hat{\theta} \\ \hat{\omega} \end{bmatrix} - \begin{bmatrix} 0 \\ K \end{bmatrix}(\theta - \hat{\theta}) = \quad (18)$$

$$\begin{bmatrix} 0 & 1 \\ 0 & 0 \end{bmatrix}\begin{bmatrix} \theta - \hat{\theta} \\ \omega - \hat{\omega} \end{bmatrix} - \begin{bmatrix} 0 \\ K \end{bmatrix}[1 \; 0]\begin{bmatrix} \theta - \hat{\theta} \\ \omega - \hat{\omega} \end{bmatrix} = \begin{bmatrix} 0 & 1 \\ -K & 0 \end{bmatrix}\begin{bmatrix} \theta - \hat{\theta} \\ \omega - \hat{\omega} \end{bmatrix}$$

Inasmuch as a characteristic equation of the equation (18) is expressed by the following equation (19), if K>0, then the system of the equation (18) is stable, allowing the estimated value ($\theta^\wedge$) of the rotor angle and the estimated value ($\omega^\wedge$) of the rotor angular velocity to be converged to the respective actual values. Therefore, the rotor angle and the rotor angular velocity can also be estimated without an error if the angular velocity $\omega$ is not 0.

$$\lambda^2 + K = 0 \quad (19)$$

The sensorless detector 25 calculates, in each control cycle ($\Delta t$), an estimated value ($\theta^\wedge(n+1)$) of the rotor angle and an estimated value ($\omega^\wedge(n+1)$) of the rotor angular velocity in each control cycle based on the estimated value ($\theta^\wedge(n)$) of the rotor angle, the estimated value ($\omega^\wedge(n)$) of the rotor angular velocity, and the phase difference ($\theta(n) - \theta^\wedge(n) = \theta e(n)$) in the preceding control cycle according to the following equation (20):

$$\begin{bmatrix} \hat{\theta}(n+1) \\ \hat{\omega}(n+1) \end{bmatrix} = \begin{bmatrix} 1 & \Delta t \\ 0 & 0 \end{bmatrix}\begin{bmatrix} \hat{\theta}(n) \\ \hat{\omega}(n) \end{bmatrix} + \begin{bmatrix} K_1 \\ K_2 \end{bmatrix}\sin(\theta(n) - \hat{\theta}(n)) \quad (20)$$

$$\approx \begin{bmatrix} 1 & \Delta t \\ 0 & 0 \end{bmatrix}\begin{bmatrix} \hat{\theta}(n) \\ \hat{\omega}(n) \end{bmatrix} + \begin{bmatrix} K_1 \\ K_2 \end{bmatrix}(\theta(n) - \hat{\theta}(n))$$

where $K_1$, $K_2$: predetermined constants.

If the rotor angle is detected by the sensorless detector 25 as described above, then, as shown in FIG. 4(b), a phenomenon occurs in which the detected rotor angle is advanced depending on the magnitude of the armature currents.

The memory stores therein a data map 30 (see FIG. 1, corresponding to reference data according to the present invention) representing the correlation between advanced angles (θ) and armature currents (Is) as shown in FIG. 4(b). Based on an advanced angle (θd) obtained when an armature current (Is) of the motor 3 which is detected from a detected U-axis current (IU_s) and a detected W-axis current (IW_s) is applied to the data map 30, the sensorless detector 25 angularly corrects the d- and q-axes with the command current corrector 17 (see FIG. 1) according to the equation (21) given below. The sensorless detector 25 thus corrects the d-axis current command from Id_c into Id_ca and the q-axis current command from Iq_c into Iq_ca, thus canceling out the advanced angle.

$$\begin{bmatrix} Id\_ca \\ Iq\_ca \end{bmatrix} = \begin{bmatrix} \cos(-\theta d) & \sin(-\theta d) \\ -\sin(-\theta d) & \cos(-\theta d) \end{bmatrix} \begin{bmatrix} Id\_c \\ Iq\_c \end{bmatrix} \quad (21)$$

Figure 5:
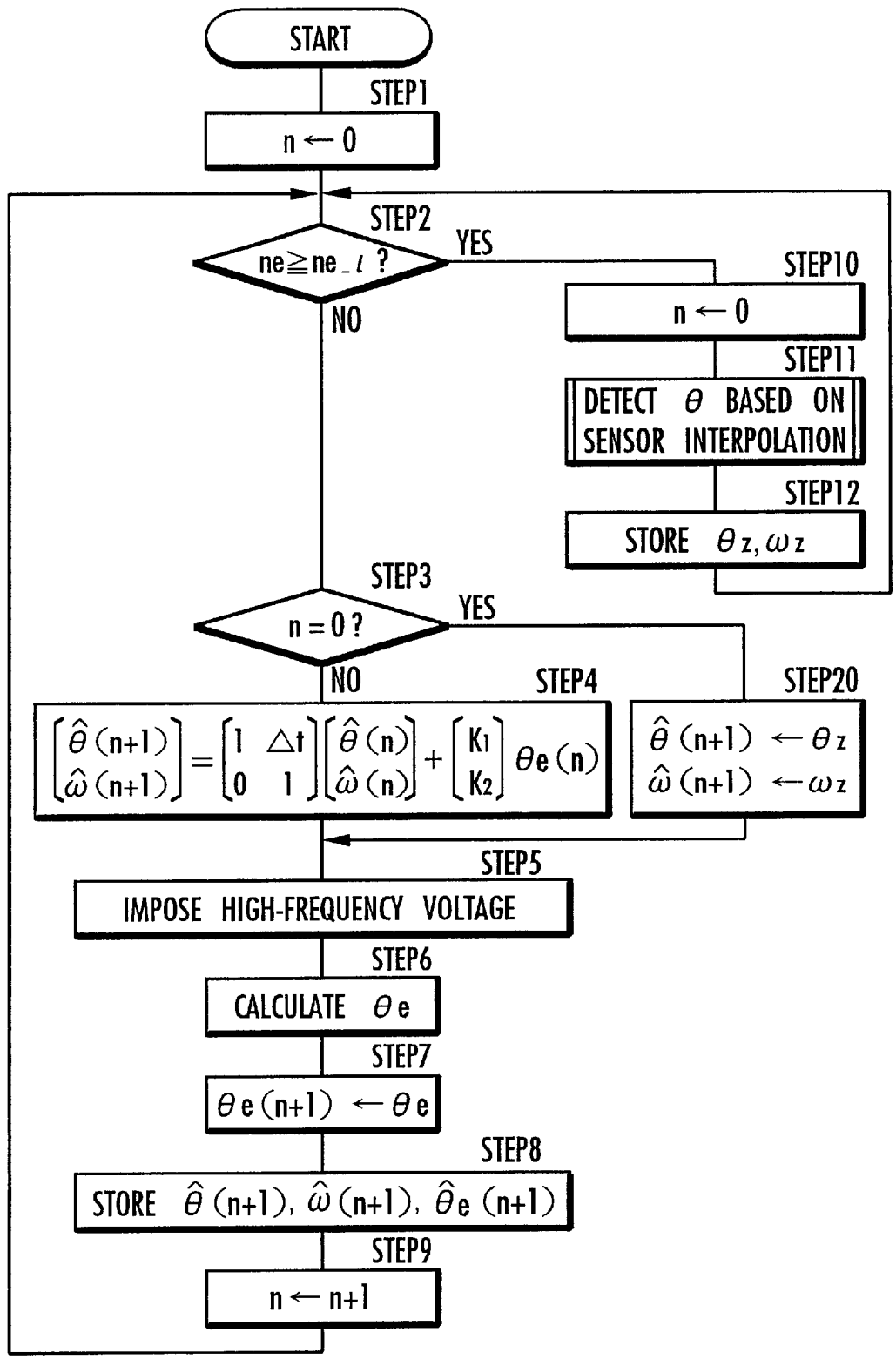
FIG. 5 is a flowchart of a processing sequence for detecting the rotor angle of the motor.

When the process of detecting the rotor angle with the sensor interpolation detector 24 changes to the process of detecting the rotor angle with the sensorless detector 25, the accuracy with which to detect the rotor angle may be lowered, and the continuity of detected rotor angles may be lost, making the behavior of the motor 3 unstable. The rotor angle detector 15 performs a process of preventing the behavior of the motor 3 from becoming unstable. This process of preventing the behavior of the motor 3 from becoming unstable will be described below with reference to FIG. 5.

The rotor angle detector 15 resets a counter variable n (n=0) in STEP1, and then determines whether or not the detected rotational speed (ne) of the motor 3 out-putted from the rotational speed detector 23 (see FIG. 1) is equal to or higher than a predetermined rotational speed (ne_1). If the detected rotational speed (ne) of the motor 3 is equal to or higher than the predetermined rotational speed (ne_1), then control branches to STEP10.

STEP10 through STEP12 represent a process of detecting the rotor angle with the sensor interpolation detector 24. In STEP11, the sensor interpolation detector 24 interpolates the pulse signal (KSp) outputted from the crankshaft angle sensor 14 to detect the rotor angle, as described above. In STEP12, the sensor interpolation detector 24 stores the detected rotor angle as θz into the memory. The sensor interpolation detector 24 calculates a rotor angular velocity (ω) according to the following equation (22) and stores the calculated rotor angular velocity as ωz into the memory:

$$\omega = Kg \times (\theta\_new - \theta\_old) \quad (22)$$

where Kg: a predetermined constant, θ_new: a rotor angle calculated in the present control cycle, and θ_old: a rotor angle calculated in the preceding control cycle.

Thus, while the process of detecting the rotor angle is being carried out by the sensor interpolation detector 24, the rotor angle (θz) and the rotor angular velocity (ωz) which are calculated in each control cycle are sequentially updated and stored into the memory. The period of time in which STEP2, STEP10 through STEP12 are carried out serves as a control cycle of the process of detecting the rotor angle with the sensor interpolation detector 24.

If the detected rotational speed (ne) of the motor 3 is lowered and becomes less than the predetermined rotational speed (ne_1), then control goes from STEP2 to STEP3. STEP3 through STEP8, STEP20 represent the process of detecting the rotor angle with the sensorless detector 25.

The sensorless detector 25 determines whether the counter variable n is 0 or not in STEP3. If n is 0, i.e., if the present control cycle is a first control cycle after the process of detecting the rotor angle with the sensor interpolation detector 24 has changed to the process of detecting the rotor angle with the sensorless detector 25, then control branches from STEP3 to STEP20.

In STEP20, the sensorless detector 25 uses the rotor angle (θz) and the rotor angular velocity (ωz) which have been stored in the memory as an estimated value (θ^(1)) of the rotor angle and an estimated value (ω^(1)) of the rotor angular velocity in the first control cycle, and detects the estimated value (θ^(1)) of the rotor angle as the rotor angle of the motor 3.

Then, control goes to STEP5 in which the high-frequency voltage imposer 22 (see FIG. 1) imposes a high-frequency voltage on the output signal from the first PI adjuster 21. In STEP6, the sensorless detector 25 detects a detected d-axis current (Id_s) depending on the imposed high-frequency voltage from the output signal from the 3-phase/dq converter 16, and calculates a phase difference (θe) by putting the detected d-axis current (Id_s) and the frequency of the high-frequency voltage respectively into Id, f in the equation (15).

In STEP7, the sensorless detector 25 uses the calculated phase difference (θe) as a phase difference (θe(1)) in the present control cycle (first control cycle). In STEP8, the sensorless detector 25 stores the estimated value (θ^(1)) of the rotor angle, estimated value (ω^(1)) of the rotor angular velocity, and the phase difference (θe(1)) in the first control cycle into the memory. In STEP9, the sensorless detector 25 increments the counter variable n by 1. Thereafter, control returns to STEP2.

If the detected rotational speed (ne) of the motor 3 is lower than the predetermined rotational speed (ne_1) in STEP2, then control goes to STEP3. Since the counter variable n has been incremented (n=1), control goes to STEP4 in which the sensorless detector 25 performs the follow-up operation with the observer according to the equation (20) to update an estimated value (θ^(2)) of the rotor angle and an estimated value (ω^(2)) of the rotor angular velocity, thereby calculating a rotor angle and a rotor angular velocity in the second control cycle.

The rotor angle and the rotor angular velocity in the second control cycle are calculated reflecting the rotor angle (θ^(1)=θz) and the rotor angular velocity (ω^(1)=ωz) detected in the final control cycle of the sensor interpolation detecting process, which are the rotor angle and the rotor angular velocity in the first control cycle.

In each of the third and following control cycles, the rotor angle and the rotor angular velocity are updated in STEP4, reflecting the rotor angle and the rotor angular velocity calculated in the preceding control cycle. Therefore, the process of detecting the rotor angle with the sensor interpolation detector 24 changes continuously to the process of detecting the rotor angle with the sensorless detector 25, preventing the motor 3 from operating unstably upon the change from the former process to the latter process.

In the control flow, the period of time in which STEP2 through STEP9 are carried out serves as a control cycle of the process of detecting the rotor angle with the sensorless detector 25.

In the present embodiment, the crankshaft angle sensor for detecting the rotational speed of the engine 2 is used as the rotational speed sensor and the angle sensor according to the present invention. However, a rotational speed sensor and an angle sensor may be employed separately from the crankshaft angle sensor.

In the present embodiment, the estimated pulse inversion time (T_n) is calculated using the first preceding pulse inversion time (T_b1) and the second pulse inversion time (T_b2) which precedes the first preceding pulse inversion time (T_b1). However, the estimated pulse inversion time may be calculated using the third preceding pulse inversion time or a further preceding pulse inversion time.

Although a certain preferred embodiment of the present invention has been shown and described in detail, it should be understood that various changes and modifications may be made therein without departing from the scope of the appended claims

What is claimed is:

1. A motor control apparatus comprising:
a current sensor for detecting a current flowing through an armature of a motor having a salient-pole rotor;
a rotational speed sensor for detecting a rotational speed of said motor;
an angle sensor for outputting a pulse signal each time a rotor angle of the motor reaches a predetermined angle when the motor is rotated;
high-frequency voltage applying means for applying a high-frequency voltage to the armature of the motor;
rotor angle detecting means for carrying out a first rotor angle detecting process to apply the high-frequency voltage from said high-frequency voltage applying means to said armature and detect the rotor angle of said motor based on a change in the current detected by said current detector depending on the applied high-frequency voltage when the detected rotational speed of said motor is lower than a predetermined rotational speed, and carrying out a second rotor angle detecting process to detect the rotor angle of said motor based on the pulse signal outputted from said angle sensor when the detected rotational speed of said motor is equal to or higher than said predetermined rotational speed; and
energization control means for controlling energization of said armature based on the rotor angle of said motor which is detected by said rotor angle detecting means;
said rotor angle detecting means comprising means for sampling the current detected by said current sensor in each given control cycle to detect the rotor angle of said motor in said first rotor angle detecting process, and, when said second rotor angle detecting process changes to said first rotor angle detecting process, detecting the rotor angle finally detected in said second rotor angle detecting process as the rotor angle in a first control cycle of said first rotor angle detecting process, and, in subsequent control cycles, detecting the rotor angle in a present control cycle using the rotor angle detected in a preceding control cycle as a calculation parameter.

2. A motor control apparatus according to claim 1, wherein said rotor angle detecting means comprises:
phase difference data generating means for generating phase difference data representing the phase difference ($\theta-\theta\hat{}$) between an actual value ($\theta$) and an estimated value ($\theta\hat{}$) of the rotor angle of said motor based on the detected current which is sampled in each given control cycle; and
means for, in a first control cycle of said first rotor angle detecting process when said second rotor angle detecting process changes to said first rotor angle detecting process, using the rotor angle finally detected in said second rotor angle detecting process as the estimated value ($\theta\hat{}$) of the rotor angle of said motor, calculating an estimated value ($\omega\hat{}$) of a rotor angular velocity depending on a change in the rotor angle detected in said second rotor angle detecting process, and detecting the estimated value ($\theta\hat{}$) of the rotor angle as the rotor angle of said motor, and in subsequent control cycles, using the estimated values ($\theta\hat{}$, $\omega\hat{}$) of the rotor angle and the rotor angular velocity in a preceding control cycle as calculation parameters, updating the calculation parameters with an observer which sequentially updates the calculation parameters depending on the phase difference data in order to eliminate said phase difference ($\theta-\theta\hat{}$) represented by said phase difference data calculated by said phase difference data generating means in the preceding control cycle, for thereby calculating the estimated value ($\theta\hat{}$) of the rotor angle of said motor in the present control cycle, and detecting the estimated value ($\theta\hat{}$) of the rotor angle as the rotor angle of said motor.

3. A motor control apparatus according to claim 1 or 2, wherein said energization control means comprises:
means for handling said motor as an equivalent circuit converted therefrom having a q-axis armature disposed on a q-axis which represents the direction of magnetic fluxes produced by field poles of the rotor, and a d-axis armature disposed on a d-axis which extends perpendicularly to the q-axis, and controlling energization of the armatures of said motor depending on q- and d-axes command currents;
memory means for storing reference data representing the correlation between armature currents of said motor and advanced angles of the rotor angle detected in said first rotor angle detecting process; and
current command correcting means for rotating a coordinate system having the d-axis and the q-axis in order to eliminate an advanced angle which is obtained by applying the armature current of said motor depending on said q- and d-axes command currents to said reference data, thereby to correct said q- and d-axes command currents.

4. A motor control apparatus according to claim 3, wherein said rotor angle detecting means comprises:
time measuring means for starting to measure time each time said pulse signal is inverted;
pulse inversion time memory means for storing the time measured by said time measuring means as a pulse inversion time between a preceding pulse inversion and a present pulse inversion each time said pulse signal is inverted;
pulse inversion time estimating means for determining an estimated pulse inversion time which represents an estimated value of a time from the present pulse inversion to a next pulse inversion based on a plurality of pulse inversion times which are stored in said pulse inversion time memory means, each time said pulse signal is inverted; and
means for detecting a present rotor angle from the ratio of the time measured by said time measuring means to the present estimated pulse inversion time in said second rotor angle detecting process.

5. A motor control apparatus according to claim 4, wherein said motor is connected to an engine mounted on a hybrid vehicle, and said angle sensor comprises a crankshaft angle sensor associated with said engine.

6. A motor control apparatus according to claim 1 or 2, wherein said rotor angle detecting means comprises:
time measuring means for starting to measure time each time said pulse signal is inverted;
pulse inversion time memory means for storing the time measured by said time measuring means as a pulse inversion time between a preceding pulse inversion and a present pulse inversion each time said pulse signal is inverted;

pulse inversion time estimating means for determining an estimated pulse inversion time which represents an estimated value of a time from the present pulse inversion to a next pulse inversion based on a plurality of pulse inversion times which are stored in said pulse inversion time memory means, each time said pulse signal is inverted; and means for detecting a present rotor angle from the ratio of the time measured by said time measuring means to the present estimated pulse inversion time in said second rotor angle detecting process.

7. A motor control apparatus according to claim 6, wherein said motor is connected to an engine mounted on a hybrid vehicle, and said angle sensor comprises a crankshaft angle sensor associated with said engine.

* * * * *